US012767322B2

(12) United States Patent
Chater et al.

(10) Patent No.: US 12,767,322 B2
(45) Date of Patent: Oct. 20, 2026

(54) LANDING GEAR UNIT EQUIPPED WITH A STATIC ELECTRICITY DISSIPATOR SYSTEM AND AIRCRAFT

(71) Applicant: AIRBUS HELICOPTERS, Marignane Cedex (FR)

(72) Inventors: Skander Chater, Marseilles (FR); Pascal Tison, Cornillon-Confoux (FR)

(73) Assignee: AIRBUS HELICOPTERS, Marignane Cedex (FR)

( * ) Notice: Subject to any disclaimer, the term of this patent is extended or adjusted under 35 U.S.C. 154(b) by 0 days.

(21) Appl. No.: 19/239,064

(22) Filed: Jun. 16, 2025

(65) Prior Publication Data

US 2026/0084809 A1 Mar. 26, 2026

(30) Foreign Application Priority Data

Sep. 26, 2024 (FR) .................................. FR2410292

(51) Int. Cl.
*B64C 25/20* (2006.01)
*B64C 25/32* (2006.01)

(52) U.S. Cl.
CPC .............. *B64C 25/20* (2013.01); *B64C 25/32* (2013.01)

(58) Field of Classification Search
CPC ......... B64C 25/20; B64C 25/32; B64C 25/34; B64C 25/58
See application file for complete search history.

(56) References Cited

U.S. PATENT DOCUMENTS 2,677,516 A * 5/1954 Pilling .................... B64C 25/32 291/1
2009/0050736 A1* 2/2009 Bennett ................... B64C 25/34 244/102 R
2015/0136902 A1* 5/2015 Green ..................... B64C 25/42 244/103 R
2023/0044164 A1* 2/2023 Demille ................. B64D 37/00
(Continued)

FOREIGN PATENT DOCUMENTS

CN 108860632 A 11/2018
CN 112109908 A 12/2020
(Continued)

OTHER PUBLICATIONS

French Search Report for French Application No. FR2410292, Completed by the French Patent Office, Dated Mar. 13, 2025, 17 pages.

*Primary Examiner* — Rodney A Bonnette
(74) *Attorney, Agent, or Firm* — BROOKS KUSHMAN P.C.

(57) ABSTRACT

A landing gear unit comprising at least one contact member, a shock absorber and a system for the dissipation of static electricity, the shock absorber being connected to the contact member. The static electricity dissipation system comprises a framework integral with a rotation shaft of the contact member and provided with a main guide rail and a bottom stop, a slider along the main guide rail, an elongate metal wand integral with the slider extending towards the bottom stop, a drive part connected to the shock absorber, movable with respect to the rotation shaft, and moving with respect to the framework towards the bottom stop, when the shock absorber is compressed, and generating a sliding of the slider along the main guide rail.

14 Claims, 6 Drawing Sheets

(56) References Cited

U.S. PATENT DOCUMENTS

| | | | | |
|---|---|---|---|---|
| 2023/0133313 | A1* | 5/2023 | Boyer | G01L 5/0052<br>244/103 R |
| 2023/0373650 | A1* | 11/2023 | Trevisan | B64C 25/34 |

FOREIGN PATENT DOCUMENTS

| | | | |
|---|---|---|---|
| CN | 213638311 | U | 7/2021 |
| KR | 20000004409 | U | 3/2000 |

* cited by examiner

LANDING GEAR UNIT EQUIPPED WITH A STATIC ELECTRICITY DISSIPATOR SYSTEM AND AIRCRAFT

CROSS REFERENCE TO RELATED APPLICATION

This application claims priority to French patent application No. FR 24 10292 filed on Sep. 26, 2024, the disclosure of which is incorporated in its entirety by reference herein.

TECHNICAL FIELD

The present disclosure is in the field of static electricity dissipation devices, and in particular those intended to be fitted to aircraft.

BACKGROUND

The present disclosure relates to a landing gear unit provided with a static electricity dissipator system as well as to an aircraft comprising at least one such landing gear unit.

An aircraft conventionally comprises members for dissipating static electricity accumulated in flight to the ground.

A first solution consists in obtaining static electricity dissipation via the landing gear unit tires. For this purpose, these tires may be made using a rubber material with a high carbon content.

A second solution consists in incorporating, on a landing gear unit, a metallization circuit leading to a static electricity dissipator wand in contact with the ground. Such a wand is also referred to as a "brush".

Although this second solution is effective, the prolonged friction of the free end of the static dissipator wand on the ground tends to degrade it. The static dissipator wand may therefore need to be replaced regularly.

In addition, a static dissipator wand may flap in flight when the landing gear unit is extended. This static electricity dissipator wand is then likely to degrade surrounding parts. For example, a static electricity dissipator wand may degrade the protective or paint layers of the surrounding parts following such flapping, such as a wheel rim or a brake caliper, for example. The flapping of a static electricity dissipator wand may then give rise to a maintenance task.

Finally, a static electricity dissipator wand is subject to a risk of tearing off if it encounters an obstacle, especially during landing. Such an obstacle may, by way of illustration, take the form of a grid.

In this context, a known landing gear unit comprises a shock absorber and a static electricity dissipator wand attached to a piston of the shock absorber. This solution is interesting, but does not prevent the flapping of the static electricity dissipator wand in flight or its tearing off during landing.

Document CN 108860632 describes an extendible static electricity discharge system for an aircraft. The system includes a storage cylinder, a static discharge rod and a dedicated actuator. The actuator moves the static discharge rod between a stretched position and a retracted position, as needed. The actuator may take various forms, such as, in particular, the form of a pneumatic system, a temperature-sensitive system, a motorized system, or a hydraulic system.

Document KR2020000004409 discloses a static electricity discharge system for a car, cooperating with a braking system.

Document US 2023/133313 A1 relates to landing gear for an aircraft and comprises a landing leg having proximal and distal ends, the proximal end being able to be coupled to the fuselage of the aircraft.

The landing leg comprises a shock absorber having a piston that is movable with respect to the cylinder between extended and retracted positions. A wheel is coupled to the distal end of the landing leg.

Document U.S. Pat. No. 2,677,516 A discloses means for reducing the friction of a wheel fitted to an aircraft landing gear.

Document CN 112 109 908 A discloses an electrostatic discharge device for a helicopter. Such an electrostatic discharge device comprises a steel cable and a hook made of conductive materials. One end of an unhooking device is connected to the electrostatic discharge device, and the other end of the unhooking device is configured to rotatably connect to or separate from a connecting seat.

Finally, document CN 213 638 311 U describes another electrostatic discharge device for helicopters.

SUMMARY

An object of the present disclosure is therefore to propose a landing gear unit provided with an innovative static electricity dissipation system that aims to limit at least one of the aforementioned drawbacks.

According to the disclosure, a landing gear unit comprises at least one contact member, a shock absorber and a static electricity dissipation system, the shock absorber being compressed along a damping axis, the shock absorber being connected to the contact member.

Such a landing gear unit is intended to be fitted to an aircraft and, in particular, an aircraft provided with a rotary wing. Such an aircraft may comprise a plurality of landing gear units, optionally retractable into an airframe of the aircraft. The shock absorber is connected to the contact member via a rotation shaft about which the contact member can rotate or pivot.

The static electricity dissipation system is characterized in that it comprises:

- a framework integral with the rotation shaft about which the contact member rotates, the framework being provided with a main guide rail and a bottom stop;
- a slider having one degree of freedom of motion in translation along said main guide rail along a guide axis;
- a metal wand attached to the slider, the wand having an elongate shape and extending from the slider towards the bottom stop, the bottom stop having an orifice configured to guide the wand in translation; and
- a drive part connected to the shock absorber, and movable with respect to the rotation shaft, the drive part moving with respect to the framework towards the bottom stop, parallel to the damping axis, when the shock absorber is compressed, to generate sliding of the slider along the main guide rail.

The landing gear unit contact member is the element of the landing gear unit that comes into contact with the ground during the landing of an aircraft fitted with this landing gear unit. The contact member may, for example, comprise a wheel, a skid or a ski.

The framework is integral with the rotation shaft, and therefore fixed with respect to this rotation shaft. The framework therefore moves with this rotation shaft. Consequently, during a landing of an aircraft fitted with the landing gear unit, the framework is substantially fixed with respect to the ground, and, for example, substantially vertical.

The main guide rail has an elongate shape extending mainly parallel to the guide axis. The wand is fixed to the slider and has an elongate shape extending from the slider, also mainly parallel to this guide axis. The slider has at least one degree of freedom of motion in translation with respect to the main guide rail along the guide axis and can thus slide along the main guide rail, parallel to this guide axis. The slider may be connected to the main guide rail by a slide-type connection, the slider then having a single degree of freedom of motion in translation with respect to this main guide rail. Alternatively, the slider may be connected to the main guide rail by a sliding pivot type connection, and then have one degree of freedom of motion in translation and one degree of freedom of motion in rotation with respect to this main guide rail.

The bottom stop is located between the slider and the ground when the landing gear unit touches the ground. The bottom stop comprises an orifice, for example of circular shape, suitable for passage of the wand.

During the landing of an aircraft fitted with a landing gear unit according to the disclosure, the shock absorber is compressed along the damping axis. This compression induces the movement of the drive part towards the ground. This drive part pushes the slider towards the bottom stop, which generates the movement of the wand through the orifice of the bottom stop to the ground. In this way, during a landing, the wand is deployed to come into contact with the ground in order to dissipate the static electricity accumulated by the aircraft during the flight.

The wand is thus operational only during landing and, in particular, during a compression of the shock absorber of the landing gear unit, the slider moving at that time. Thus, the wand is advantageously in an at least partially retracted position in flight, thus avoiding the inconvenience caused by a conventional wand that can flap in flight. In addition, the wand is fixed to the slider, preferably in a removable manner, to allow its replacement if necessary.

This static electricity dissipation system proves to be simple by advantageously using available energy and an existing member to deploy the wand during the landing phase.

Finally, the landing gear unit may comprise a metallization circuit ensuring electrical continuity between the wand and a sub-assembly that can potentially become charged with static electricity. This metallization circuit may comprise metal parts and/or different paths designed to provide an electrical connection comprising, for example, plain bearings with helical electrical contacts and metallization braids, in particular.

The control system according to the disclosure may comprise one or more of the following features, taken individually or in combination.

According to one possibility, the shock absorber may be provided with a body and a piston sliding in the body along the damping axis. The piston may then be connected to the rotation shaft and the drive part may be integral with the body. In this case, the drive part moves with the shock absorber body, and the framework moves with the piston.

Conversely, the body of the shock absorber may be connected to the rotation shaft and the drive part may be integral with the piston. In this case, the drive part moves with the shock absorber piston and the framework moves with the body.

According to another possibility compatible with the preceding possibilities, the guide axis may be parallel to the damping axis. In this case, the slider slides along the main guide rail parallel to the shock absorber axis.

According to another possibility compatible with the preceding possibilities, the framework may comprise a secondary guide rail, the drive part having one degree of freedom of motion in translation along the secondary guide rail and thus sliding along this secondary guide rail.

The drive part may be connected to the secondary guide rail by a slider-type connection, the drive part then having a single degree of freedom of motion in translation with respect to this secondary guide rail. Alternatively, the drive part may be connected to the secondary guide rail by a sliding pivot type connection, and may then have one degree of freedom of motion in translation and one degree of freedom of motion in rotation with respect to this secondary guide rail.

For example, the secondary guide rail may be elongate in shape and extend along a complementary axis parallel to the guide axis. In this case, the main and secondary guide rails are parallel.

According to another possibility compatible with the preceding possibilities, the wand may have an elongate shape and extend from the slider towards the bottom stop, or even beyond the bottom stop. For example, the wand may extend from the slider towards the bottom stop, parallel to the guide axis. The wand may be at least partially, or even entirely, metallic, to allow the transmission of an electric current, and thus the dissipation of static electricity when in contact with the ground. For example, the wand may comprise a metallic cable or braid.

According to another possibility compatible with the preceding possibilities, the static electricity dissipation system may comprise a lift spring arranged between the slider and the bottom stop, the lift spring being compressed between the slider and the bottom stop when the shock absorber is compressed.

The lift spring thus contributes to the return of the slider along the main guide rail, and consequently of the wand, once the shock absorber expands. The lift spring may, for example, comprise a helical compression spring.

According to one possibility compatible with the preceding possibilities, the drive part may be integral with the slider. For example, the drive part may be fixed to the slider by a fixing member, such as one or more screws, or by a hook, or it may even be welded to the slider. In this case, the drive part also causes the slider to lift, i.e., causes the slider to slide away from the bottom stop, and consequently the wand when the shock absorber expands.

Alternatively, the drive part may be in contact, or even in abutment, with the slider, thus causing the slider to slide towards the bottom stop, and consequently causing the wand to be deployed, when the shock absorber is compressed. In this case, the presence of a lift spring causes the slider, and consequently the wand, to lift when the shock absorber expands until it comes into abutment against the drive part or against a top stop, the slider being positioned between the top and bottom stops.

According to another possibility, when the static electricity dissipation system includes the lift spring as previously described, the framework may include a top stop to which the slider slides along the main guide rail along the guide axis under the action of the compressed lift spring, the slider being positioned between the top and bottom stops. The framework may also include a ramp inclined with respect to the guide axis and the slider may include a support as well as a slide-in unit and a return spring, the slide-in unit having one degree of freedom of motion in translation with respect to the support along a sliding axis, not parallel to the guide axis, in order to slide with respect to the support, the slide-in unit including a protuberance configured to cooperate with the ramp to cause movement of the slide-in unit with respect to the support along the sliding axis between an extended position and a retracted position, the return spring opposing the movement of the slide-in unit from the extended position to the retracted position, the drive part and the slide-in unit being partially in line with each other, parallel to the guide axis AX2 when the slide-in unit is in the extended position, the drive part and the slide-in unit not being in line with each other, parallel to the guide axis, when the slide-in unit is in the retracted position.

Thus, as long as the protuberance is not in contact with the ramp, the slide-in unit is in the extended position with respect to the support of the slider and the drive part. The drive part is partially in line with the slide-in unit, with a portion of the drive part overlapping the slide-in unit parallel to the guide axis. The drive part can then be or come into contact, or even be in abutment, on this slide-in unit, in particular during a compression of the shock absorber. Consequently, during the compression of the shock absorber, for example during a landing, the movement of the drive part causes the slider to slide towards the bottom stop, by means of the slide-in unit, and thus causes the deployment of the wand.

Then, as soon as the protuberance comes into contact with the ramp, the movement of the drive part and the slider towards the bottom stop causes, by shape interference between the ramp and the protuberance, a movement of the slide-in unit with respect to the support along the sliding axis from the extended position to the retracted position. As long as the slide-in unit is not in the retracted position with respect to the support, the drive part is still partially in line with the slide-in unit, and consequently in contact, or even in abutment, on the slide-in unit, and the movement of the drive part causes the slider to slide towards the bottom stop, by means of the slide-in unit, and thus causes the deployment of the wand.

As soon as the slide-in unit reaches the retracted position with respect to the support, the drive part is no longer in line with the slide-in unit, since no part of the drive part overlaps the slide-in unit parallel to the guide axis. The drive part is then no longer in contact, or in abutment, on the slide-in unit. As a result, the movement of the drive part no longer causes the slide to slide towards the bottom stop, nor does it cause the wand to move. In addition, the drive part is configured so that it is never superposed parallel to the guide axis with the protuberance, regardless of the position of the slide-in unit with respect to the support.

On the contrary, under the action of the lift spring, that has been compressed between the slider and the bottom stop during the sliding of the slider towards the bottom stop, the slider slides in the opposite direction, namely to move away from the bottom stop, until it reaches the top stop. This sliding of the slider towards the top stop is accompanied by a retraction of the wand through the orifice of the bottom stop.

The static electricity dissipation system of the landing gear unit according to the disclosure thus allows automatic retraction of the wand once the static electricity has been dissipated. More specifically, such dissipation requires contact of the wand with the ground for a period of less than one second. Therefore, once this contact has been established for a sufficient period of time, the static electricity dissipation system of the landing gear unit according to the disclosure advantageously allows such a retraction, quickly and without the use of a hydraulic, electric or pneumatic actuator. Such a retraction contributes to limiting the wear of the wand by reducing its contact with the ground to that which is strictly necessary, in particular by avoiding this contact when the aircraft is taxiing. Such retraction also reduces the risk of tearing off of the wand on the ground during such taxiing.

The axis of sliding of the slide-in unit with respect to the support may be, for example, perpendicular to the guide axis, in particular in order to maximize the movement of this slide-in unit with respect to the support.

In addition, the position and inclination of the ramp with respect to the guide axis determines the length of the wand protruding from the bottom stop when the slide-in unit reaches the retracted position. The ramp may be positioned with respect to the contact member, such that the slide-in unit is in the retracted position when the wand protrudes from the bottom stop by a predetermined deployed distance.

For example, the predetermined deployed distance may be greater than a distance between the bottom stop and the ground, when the landing gear unit is in contact with the ground.

In particular, if the contact member comprises a wheel and if the bottom stop is positioned at the same height as an axis of rotation of this wheel, the predetermined deployed distance is, for example, greater than the radius of the wheel.

According to another possibility compatible with the preceding possibilities, when the piston of the shock absorber is in a maximum extended position with respect to the body, the wand may protrude from the bottom stop by a non-zero extension distance. The maximum extended position of the piston with respect to the body is reached when the contact member hangs in the space under the shock absorber, for example when the aircraft fitted with the landing gear unit is in flight and the landing gear unit is not retracted, if it is a retractable landing gear unit. The wand then extends below the bottom stop. However, the length of the wand protruding below the bottom stop is small, on the order of a few centimeters, that prevents the wand from flapping or the wand from coming into contact with and degrading parts of the landing gear unit, such as the framework, the shock absorber and/or the contact member.

Alternatively, when the piston is in the maximum extended position with respect to the body, the wand may not protrude beyond the bottom stop. In this way, the wand does not protrude from the bottom stop when the aircraft fitted with the landing gear unit is in flight, thus avoiding any flapping of the wand during the flight of the aircraft, and consequently any degradation by the wand of the parts of the landing gear unit.

According to another possibility compatible with the preceding possibilities, the system may comprise a compressible sleeve arranged between the slider and the bottom stop and wherein the wand is positioned. If required, the lift spring can be positioned around the sleeve. This sleeve can make it possible, during the sliding of the wand, firstly to guide the wand, and secondly to guide the lift spring, if applicable. This sleeve is configured to be compressed when the slider slides, without hindering the sliding of the slider or the movement of the wand, or the compression of the lift spring if applicable.

According to another possibility compatible with the preceding possibilities, the system may comprise the lift spring and a compressible tube arranged between the slider and the bottom stop, the lift spring being positioned in the tube. This compressible tube can make it possible, firstly, to guide the lift spring during the sliding of the wand, and secondly, to protect it from the impact of objects likely, for example, to hit it during flight or taxiing of the aircraft fitted with the landing gear. This tube is configured to compress when the slider slides, without interfering with the sliding of the slider or the compression of the lift spring.

According to another possibility compatible with the preceding possibilities, the landing gear unit may comprise a fairing, partially or totally framing the static electricity dissipation system. This fairing can protect the static electricity dissipation system, and in particular the framework, the slider, the wand, the lift spring and the drive part, from the impact of objects likely, for example, to hit it during flight or taxiing of the aircraft. This fairing can also reduce the aerodynamic drag generated by the static electricity dissipation system during a flight.

Another object of the present disclosure is an aircraft comprising at least one landing gear unit as previously described. The shock absorber may be connected to a structure of the aircraft, the wand being electrically connected to this structure. The shock absorber may be connected to the structure by its body, the piston being connected to the contact member, or vice versa. The one or more landing gear units may be fixed, or optionally retractable.

The aircraft may include a metallization circuit partially integrated with the landing gear unit and electrically connecting the wand to the structure of the aircraft. This metallization circuit thus contributes, when the wand is in contact with the ground during the landing of the aircraft, to an electrical continuity between the structure and the ground, which makes it possible to dissipate the static electricity accumulated and stored during the flight of the aircraft.

The aircraft may comprise a plurality of landing gear units, including for example two main landing gear units and one auxiliary landing gear unit. In this case, the two main landing gear units may, for example, be according to the disclosure and comprise a static electricity dissipation system as described above. Alternatively, only one of the two main landing gear units may be according to the disclosure and comprise, as such, such a static electricity dissipation system.

Alternatively, all the aircraft landing gear units may include such a static dissipation system.

BRIEF DESCRIPTION OF THE DRAWINGS

The disclosure and its advantages appear in greater detail from the following description of examples given by way of illustration with reference to the accompanying figures, wherein.

DETAILED DESCRIPTION

Elements present in more than one of the figures are given the same references in each of them.

Figure 1:
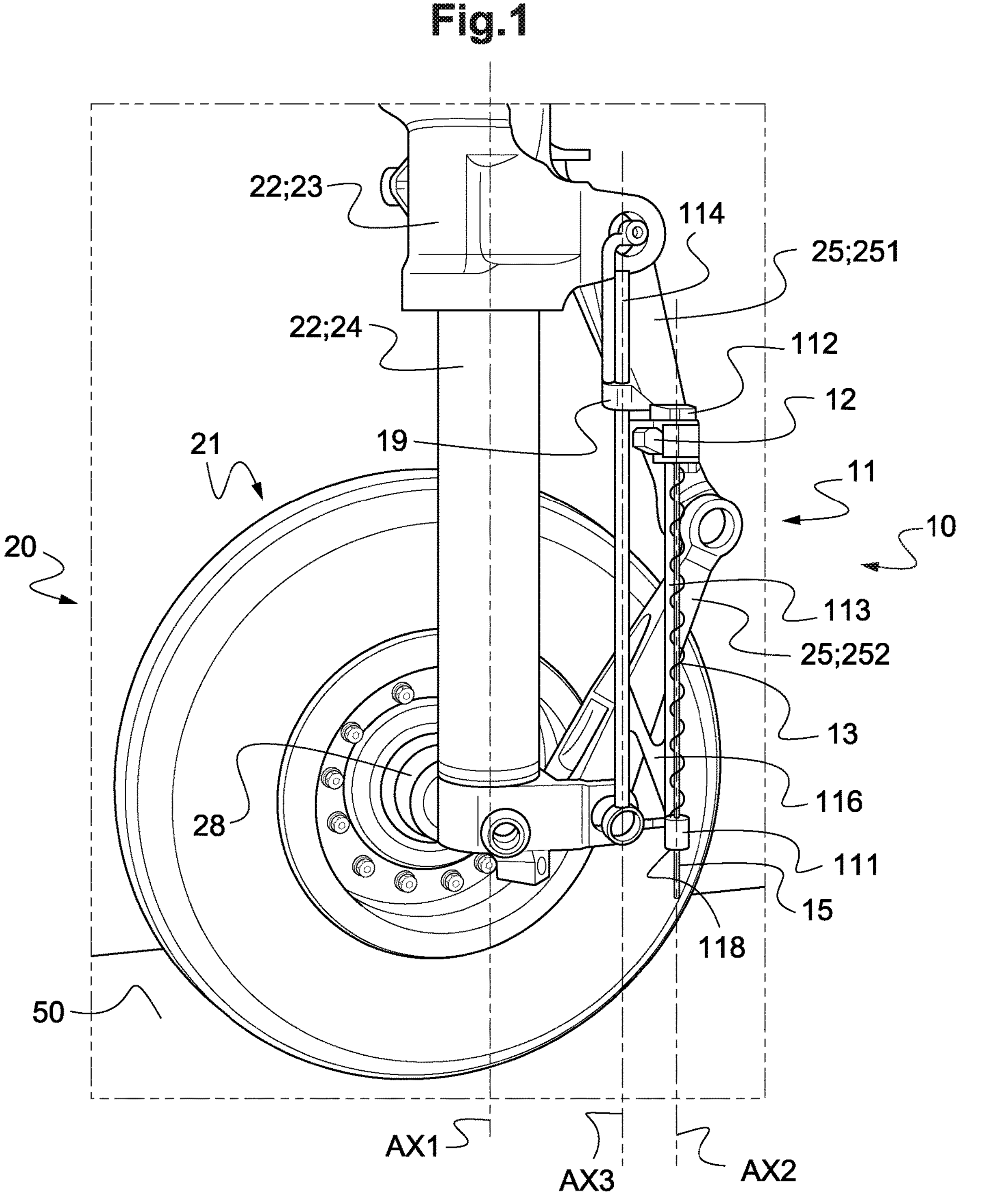
FIG. 1 is a view of a landing gear unit according to the disclosure.

FIG. 1 shows a landing gear unit 20 of an aircraft according to the disclosure. This landing gear unit 20 comprises at least one contact member 21 that is in contact with the ground 50 when the aircraft is resting on the ground, a shock absorber 22 and a static electricity dissipation system 10. The contact member 21 rotates about a rotation shaft 28. In the example shown, the contact member 21 may comprise a wheel rotating around a stub axle. Alternatively or in addition, the contact member 21 may comprise a skid or a ski.

The shock absorber 22 is provided with a body 23 and a piston 24 sliding in the body 23 along a damping axis AX1. The shock absorber 22 is connected to the contact member 21. For example, the shock absorber 22 directly or indirectly carries the rotation shaft 28, the contact member being carried by this rotation shaft 28. In addition, the landing gear unit 20 may comprise a scissors linkage 25 connecting the body 23 and the piston 24, this scissors linkage 25 being provided with a first arm 251 articulated to the body 23 and with a second arm 252 articulated to the piston 24. This landing gear unit 20 is intended to be fitted to an aircraft, in particular a rotary-wing aircraft.

The static electricity dissipation system 10 comprises a framework 11 integral with the rotation shaft 28, a slider 12, a wand 15 and a drive part 19. The framework 11 is therefore fixed with respect to the rotation shaft 28, and consequently with respect to the ground 50 when the landing gear unit 20 is on the ground. The framework 11 may be fixed directly or indirectly to this rotation shaft 28, or to the shock absorber 22, and in particular to the piston 24, according to the example shown in FIG. 1.

The framework 11 has a main guide rail 113 and a bottom stop 111. The bottom stop 111 has a ring integral with the main guide rail 113. The bottom stop 111 and the main guide rail 113 can form a single and same part. For example, the main guide rail 113 may be elongate and extend along a guide axis AX2. For example, the bottom stop 111 may be arranged at the end of the main guide rail 113 closest to the ground 50.

The slider 12 slides along the main guide rail 113, along the guide axis AX2. This slider 12 is arranged such that the bottom stop 111 is located between the slider 12 and the ground 50 when the landing gear unit 20 rests on the ground. The slider 12 may be connected to the main guide rail 113 by a slider-type, or even a sliding pivot-type, connection.

The wand 15 is at least partially, or even entirely, metallic and can, as such, transmit an electric current. The wand 15 is fixed to the slider 12, for example in a removable manner, to allow it to be replaced if necessary. The wand 15 has an elongate shape and extends from the slider 12 towards the bottom stop 111, for example parallel to the guide axis AX2.

The bottom stop 111 comprises an orifice 118, for example in the form of a cylinder, configured to be passed through by the wand 15 and for the bottom stop 111 to guide the wand 15 in translation.

The drive part 19 is connected to the shock absorber 22 and is movable with respect to the rotation shaft 28. The drive part 19 thus moves with respect to the framework 11 towards the ground 50 when the shock absorber 22 is compressed. This movement of the drive part 19 can be carried out parallel to the damping axis AX1. During this movement, the drive part 19 generates the sliding of the slider 12 along the main guide rail 113, towards the bottom stop 111.

In addition, the landing gear unit 20 may include, in the conventional manner, a metallization circuit (not shown) ensuring electrical continuity between the wand 15 and the components of the landing gear unit 20. This metallization circuit may comprise the metal parts in contact between these components up to the wand 15. This metallization circuit may, alternatively or in addition, comprise electrical connections, provided for example by plain bearings with helical electrical contacts and/or metallization braids.

The landing gear unit 20 can ensure the movement of the drive part 19 towards the bottom stop 111, during the compression of the shock absorber 22. This movement of the drive part 19 causes the slider 12 to slide towards the bottom stop 111 and the ground 50 and, consequently, the movement of the wand 15 beyond the bottom stop 111, through the orifice 118, to the ground 50. In this way, when the shock absorber 22 is compressed, the wand 15 is deployed to come into contact with the ground 50, which makes it possible to obtain an electrical connection between the static electricity dissipation system 10 and the ground 50, and consequently a dissipation of the static electricity accumulated by the landing gear unit 20 and by any element connected to the landing gear unit 20.

The wand 15 can advantageously be deployed only during compression of the shock absorber 22, the wand 15 remaining in an at least partially retracted position when the landing gear unit 20 is not in contact with the ground 50, in particular in flight. In this way, the disadvantages of a conventional wand, such as its flapping and the degradation of the components located in the vicinity of the wand 15, are avoided.

In another aspect and in the example shown, the piston 24 of the shock absorber 22 may be connected to the contact member 21 via the rotation shaft 28, and the drive part 19 is integral with the body 23. Alternatively, the body 23 may be connected to the contact member 21 via the rotation shaft 28, the drive part 19 then being integral with the piston 24.

Figure 2:
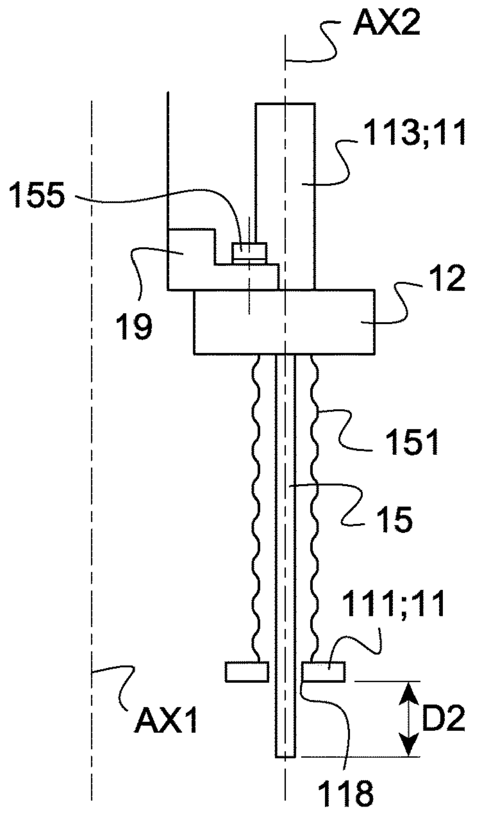
FIG. 2 is a schematic view of a first embodiment of the landing gear unit.

A first embodiment of the landing gear unit 20 according to the disclosure is shown partially and schematically in FIG. 2. In this first embodiment, the drive part 19 is integral with the slider 12. The drive part 19 may be fixed to the slider 12 in the conventional manner, for example in a dismountable manner, using one or more screws 155, or even in a non-dismountable manner, by welding.

In this case, the drive part 19 causes not only the sliding of the slider 12, and consequently the movement of the wand 15 towards the bottom stop 111 and the ground 50 during the compression of the shock absorber 22, but also their lifting, namely moving away from the bottom stop 111 and the ground 50 when the shock absorber 22 expands. As soon as the wand 15 is in contact with the ground 50, an electrical continuity may be produced between the ground 50, the wand 15 and the elements in electrical contact with the wand 15, so as to dissipate any quantity of static electricity accumulated by these elements during a flight.

Figure 3:
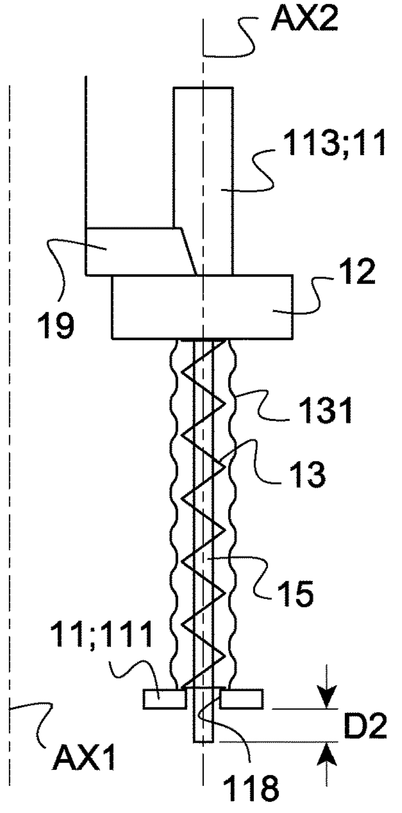
FIG. 3 is a schematic view of a second embodiment of the landing gear unit.

A second embodiment of the landing gear unit 20 according to the disclosure is shown partially and schematically in FIG. 3. According to this second embodiment, the static electricity dissipation system 10 comprises a lift spring 13 arranged between the slider 12 and the bottom stop 111, the lift spring 13 being compressed between the slider 12 and the bottom stop 111 when the shock absorber 22 is compressed.

According to this second embodiment, the drive part 19 is partially in line with the slider 12, i.e., in superposition parallel to the guide axis with the slider 12. The drive part 19 is consequently in point, linear or surface contact with the slider 12 when the shock absorber 22 is compressed, so causing the slider 12 to slide, and consequently the wand 15 to move towards the bottom stop 111 and the ground 50.

Conversely, the expansion of the shock absorber 22 causes a movement of the drive part 19 away from the bottom stop 111 and the ground 50. Simultaneously, the lift spring 13 causes the slider 12 to slide along the main guide rail 113, along the guide axis AX2, and consequently the wand 15 to move, the slider 12 and the wand 15 moving away from the bottom stop 111 and the ground 50. The sliding of the slider 12 can be stopped by the drive part 19, that acts as a top stop.

Alternatively, the framework 11 may comprise a top stop 112, shown for example in FIG. 1, up to which the slider 12 slides along the main guide rail 113, along the guide axis AX2, under the action of the compressed lift spring 13. The top stop 112 is positioned on the framework 11 so as to be located between an end position of the drive part 19 corresponding to a maximum extended position of the shock absorber 22, or even beyond this end position. This maximum extended position of the shock absorber 22 is reached in flight when no force, other than the gravitational force, is exerted vertically on the contact member 21.

Figure 4:
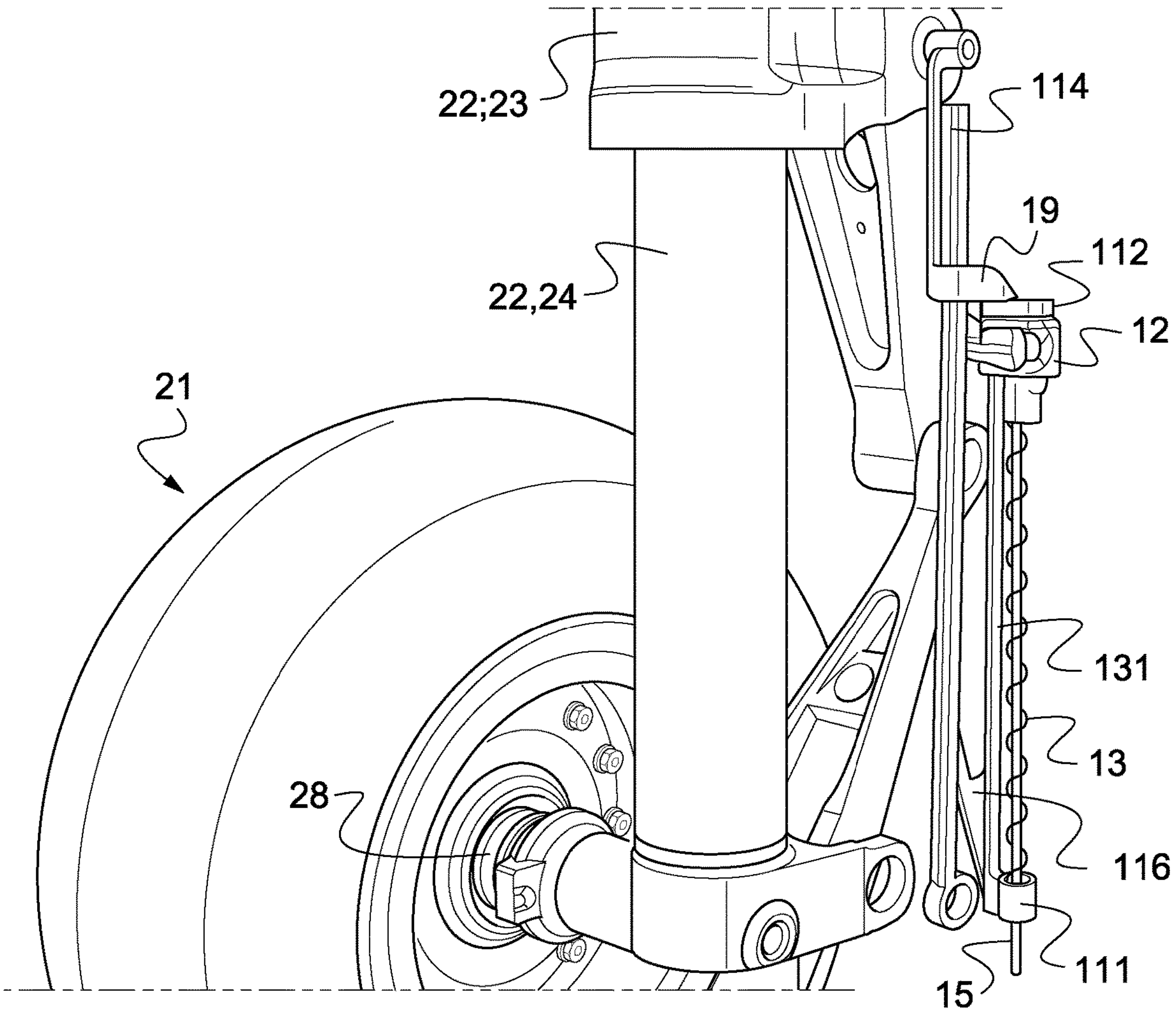
FIG. 4 is a perspective view of a third embodiment of the landing gear unit.

A third embodiment of the landing gear unit 20 according to the disclosure is shown in perspective in FIG. 4, and partially and schematically in FIGS. 5 to 10. According to this third embodiment, the static electricity dissipation system 10 comprises a lift spring 13 arranged between the slider 12 and the bottom stop 111, the lift spring 13 being compressed between the slider 12 and the bottom stop 111 when the shock absorber 22 is compressed.

Figure 5:
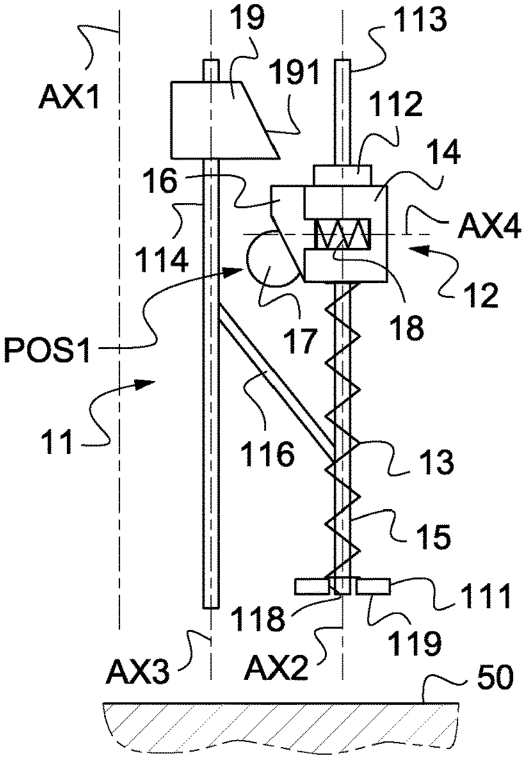
FIG. 5 is a schematic view of the third embodiment.

The framework 11 comprises a top stop 112 fixed to the main guide rail 113. The slider 12 is in abutment along the guide axis AX2 against the top stop 112 under the action of the lift spring 13, as shown in FIG. 5, when the shock absorber 22 is fully expanded and therefore in its maximum extended position. The slider 12 is then positioned between the top 112 and bottom 111 stops.

The framework 11 also comprises a ramp 116 fixed to the main guide rail 113, according to the example shown, and inclined with respect to the guide axis AX2. This ramp 116 is located along the guide axis AX2 between the top 112 and bottom 111 stops.

The slider 12 comprises a support 14, a slide-in unit 16 and a return spring 18. The slide-in unit 16 has one degree of freedom of motion in translation with respect to the support 14 along a sliding axis AX4 that is not parallel to the guide axis AX2, in order to slide with respect to the support 14. The sliding axis AX4 may be perpendicular to the guide axis AX2 as shown in FIGS. 5 to 10. However, other configurations between the sliding axis AX4 and the secondary axis AX2 are possible, as long as they are not parallel.

The slide-in unit 16 also includes a protuberance 17 configured to cooperate with the ramp 116 to cause the slide-in unit 16 to move with respect to the support 14 along the sliding axis AX4 between an extended position POS1 and a retracted position POS2. The return spring 18 opposes the movement of the slide-in unit 16 from the extended position POS1 to the retracted position POS2, and thus causes the movement of the slide-in unit 16 from the retracted position POS2 to the extended position POS1, when no force is applied to the slide-in unit 16 or the protuberance 17. The slide-in unit 16 further comprises an end-of-travel stop cooperating with the support 14 and blocking the slide-in unit in the extended position POS1 with respect to the support 14 under the action of the return spring 18.

FIGS. 5 to 10 show the system 10 for dissipation of static electricity at different times during compression and then expansion of the shock absorber 22.

As previously mentioned, FIG. 5 shows the system 10 when the shock absorber 22 is completely expanded, i.e., in the maximum extended position. The slider 12, and in particular the support 14 of this slider 12, is in abutment against the top stop 112 and the drive part 19 is located above the top stop 112, parallel to the guide axis AX2. The slide-in unit 16 is then in the extended position POS1 with respect to the support 14. The drive part 19 is partially in line with the slide-in unit 16, along the guide axis AX2, without being in contact with it.

Figure 6:
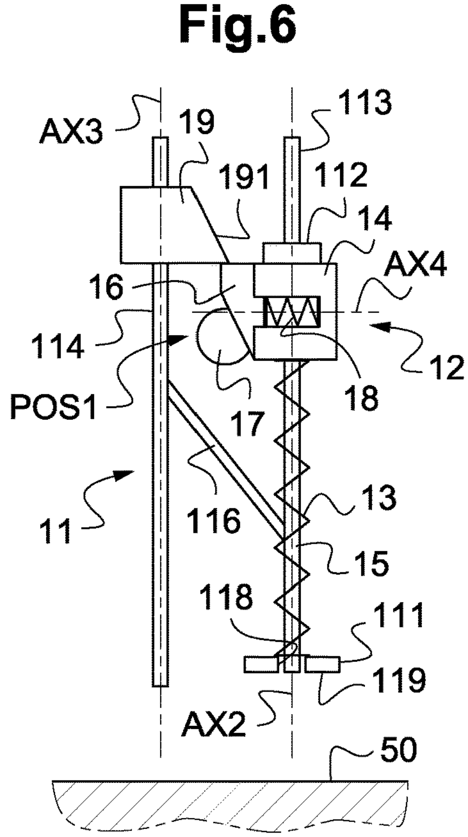
FIG. 6 is a schematic view of the third embodiment.

When the shock absorber 22 is compressed, the drive part 19 moves towards the bottom stop 111 and the ground 50, and comes into contact, for example point, linear or surface contact, with the slide-in unit 16 of the slider 12, as shown in FIG. 6, due to the position in line of the drive part 19 with respect to the slide-in unit 16, the slide-in unit 16 still being in the extended position POS1 with respect to the support 14.

Figure 7:
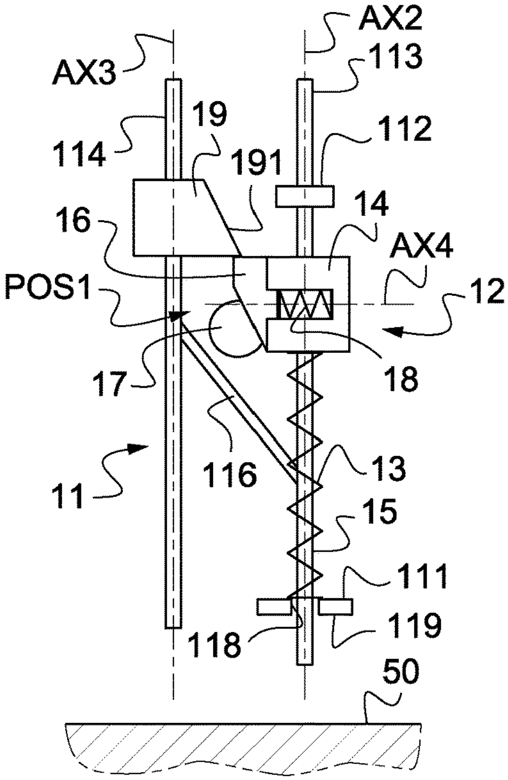
FIG. 7 is a schematic view of the third embodiment.

The compression of the shock absorber 22 continues, and the drive part 19 continues its movement towards the bottom stop 111 and the ground 50 and, due to the pressure on the slide-in unit 16, moves the slider 12, and consequently the wand 15, towards the ground 50, as shown in FIG. 7. The wand 15 then protrudes from the bottom stop 111, passing through the orifice 118.

Figure 8:
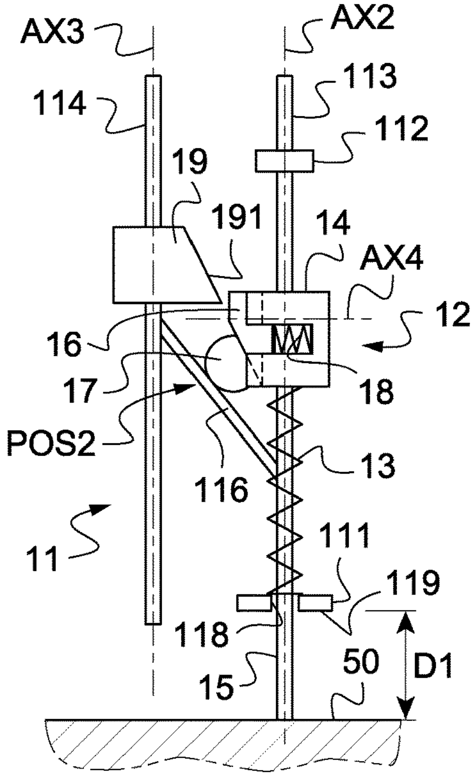
FIG. 8 is a schematic view of the third embodiment.

As the slider 12 slides toward the bottom stop 111, the protuberance 17 comes into contact with the ramp 116, that causes the slide-in unit 16 to move with respect to the support 14, to the retracted position POS2 as shown in FIG. 8. In this retracted position POS2, the drive part 19 and the slide-in unit 16 are no longer in line with each other, along the guide axis AX2. As a result, the drive part 19 is no longer in contact with the slide-in unit 16, and so continues its movement towards the ground 50 without driving the slider 12 or the wand 15. In addition, the drive part 19 is configured to never come into contact with the protuberance 17, regardless of the position of the slide-in unit 16.

It can be seen that the position of the ramp 116 allows the slide-in unit 16 to reach the retracted position POS2 after the wand 15 has come into contact with the ground 50. The ramp 116 is thus advantageously positioned with respect to the contact member 21 so that the slide-in unit 16 is in the retracted position POS2 when the wand 15 protrudes from the bottom stop 111 by a predetermined deployed distance D1, allowing this contact with the ground 50. The predetermined deployed distance D1 is for example greater than a distance between the bottom stop 111 and the ground 50 when the landing gear unit 20 is in contact with the ground 50. According to the example shown in FIG. 1, the bottom stop 111 is positioned close to the rotation shaft 28, and at the same height with respect to the ground 50 as this rotation shaft 28. In this case, the predetermined deployed distance D1 may be equal to or greater than the radius of the wheel of the contact member 21.

An electrical continuity is then ensured between the ground, the wand 15 and the elements in electrical contact with the wand 15, so as to dissipate any quantity of static electricity accumulated by these elements.

Figure 9:
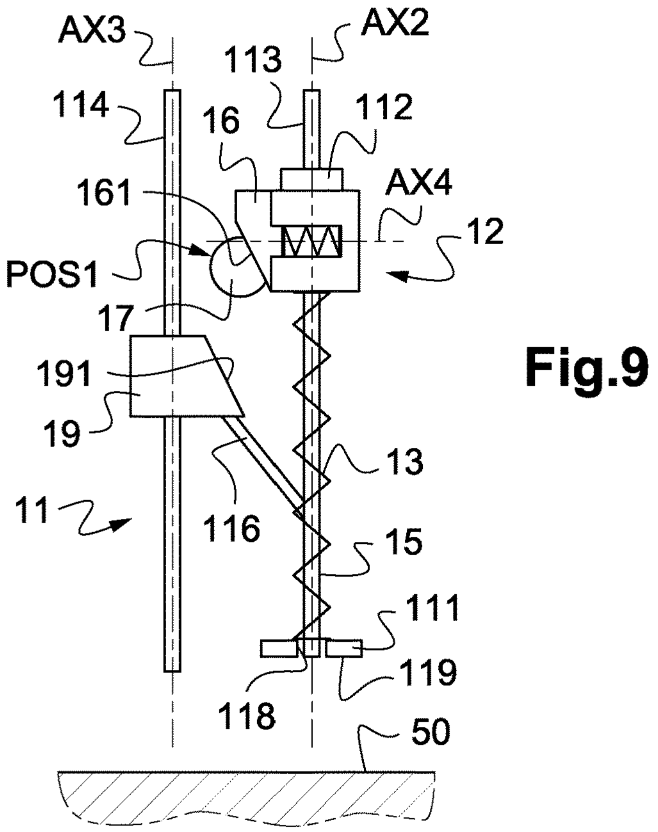
FIG. 9 is a schematic view of the third embodiment.

Then, the compression of the shock absorber 22 continues, and the drive part 19 continues its movement towards the ground 50, while the slider 12 now slides up to the top stop 112 under the action of the lift spring 13, as shown in FIG. 9. This sliding of the slider 12 then causes the wand 15 to move towards the top stop 112. The wand 15 is thus retracted and is no longer in contact with the ground 50. The slide-in unit 16 is then returned to the extended position POS1 with respect to the support 14 under the action of the return spring 18, as soon as the protuberance is no longer in contact with the ramp 116.

Figure 10:
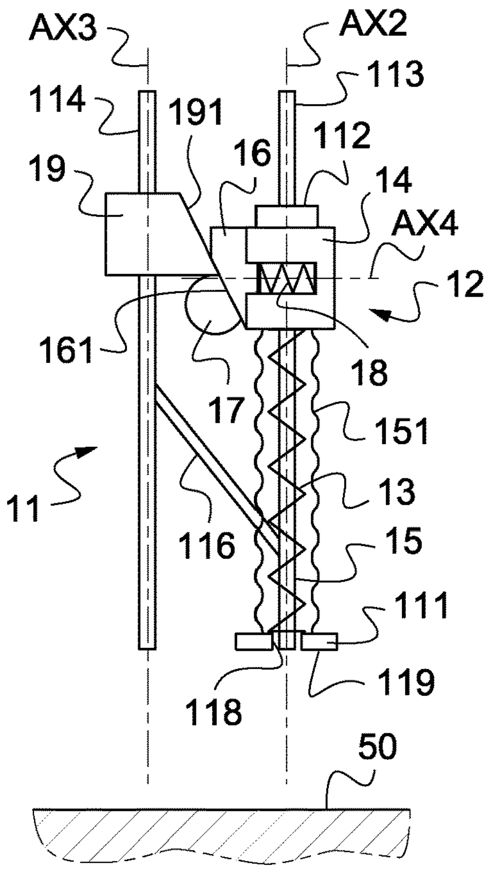
FIG. 10 is a schematic view of the third embodiment.

Finally, following this compression, the shock absorber 22 expands, causing the drive part 19 to move away from the ground 50. During this movement, the slide-in unit 16 having returned to the extended position POS1, the slide-in unit 16 is partially in line with the drive part 19, along the guide axis AX2. The drive part 19 then comes into contact with the slider 12, and in particular with the slide-in unit 16, that is in abutment against the top stop 112, as shown in FIG. 10. Advantageously, at least one of the two components among the drive part 19 and the slide-in unit 16 comprises an inclined face 161, 191 causing, during a contact between the drive part 19 and the slider 12, during the expansion of the shock absorber 22, a movement of the slide-in unit 16 with respect to the support 14 from the extended position POS1 to the retracted position POS2. In the retracted position POS2, the drive part 19 and the slide-in unit are no longer in line with each other, and the drive part 19 can then continue its movement beyond the slider 12.

The drive part 19 can thus continue its movement without hindrance, until the end of the expansion of the shock absorber 22, and reach, for example, the position shown in FIG. 5.

Independently of the three described embodiments, the guide axis AX2 may be parallel to the damping axis AX1 as shown in FIGS. 2 to 10. An inclination of the guide axis AX2 with respect to the damping axis AX1 is also possible.

Independently of these three embodiments, the framework 11 may optionally comprise a secondary guide rail 114, the drive part 19 comprising one degree of freedom of motion in translation along the secondary guide rail 114 so as to slide along this secondary guide rail 114, as shown in FIGS. 4 to 10. For example, this secondary guide rail 114 may be elongate and extend along an additional axis AX3 parallel to the guide axis AX2, the drive part 19 sliding along the secondary guide rail 114, along this additional axis AX3.

Furthermore, the static electricity dissipation system 10 may comprise a compressible sleeve 151 arranged between the slider 12 and the bottom stop 111 and wherein the wand 15 is positioned, as shown in FIGS. 2 and 10. This sleeve 151 deforms and is compressed during the sliding of the slider 12 towards the bottom stop 111. This sleeve 151 can guide the wand 15 during this sliding, and also protect the wand 15 from possible contact with any object. In addition, when the system 10 includes a lift spring 13, the lift spring 13 can be positioned around the sleeve 151, as shown in FIG. 10, such that the sleeve 151 guides the lift spring 13.

The static electricity dissipation system 10 may also comprise a compressible tube 131 arranged between the slider 12 and the bottom stop 111 and wherein the lift spring 13 is positioned, as shown in FIG. 3. This tube 131 deforms and is compressed during the sliding of the slider 12 towards the bottom stop 111. This tube 131 can thus guide the lift spring 13 during this sliding and protect the lift spring 13, as well as the wand 15, from possible contact with any object.

In addition, when the piston 24 is in the maximum extended position with respect to the body 23, the wand 15 may protrude from the bottom stop 111 by a non-zero extension distance D2, as shown in FIGS. 2 and 3. Alternatively, the wand 15 may be flush with a lower face 119 of the bottom stop 111, facing the ground 50, or even set back from this lower face 119, when the piston 24 is in the maximum extended position with respect to the body 23, as shown in FIGS. 4,5, 8 and 9.

Figure 11:
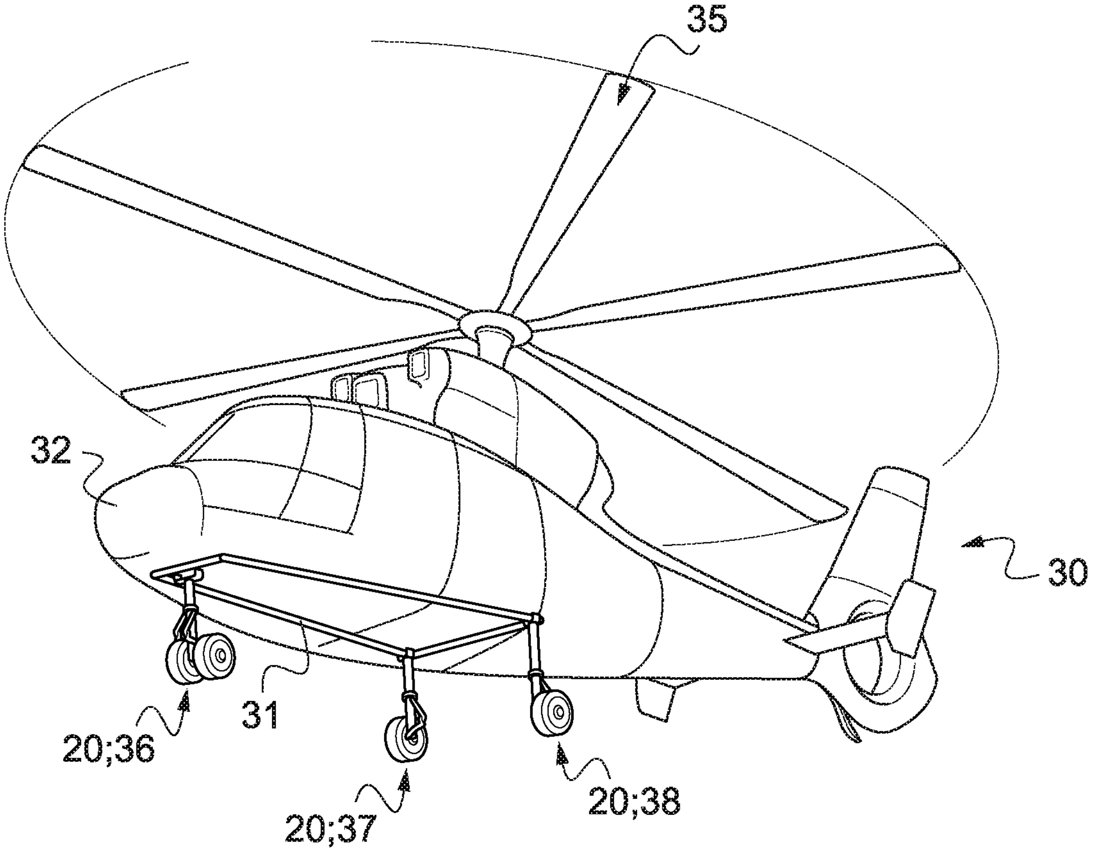
FIG. 11 is a view of an aircraft fitted with landing gear units.

According to FIG. 11, an aircraft 30, and in particular a rotary-wing aircraft, may comprise one or more landing gears 36, 37, 38. For example, an aircraft 30 may include three landing gears 36, 37, 38, as shown in FIG. 11, in particular an auxiliary landing gear 36 and two main landing gears 37, 38. Such an aircraft 30 comprises, in particular, a structure 31 of an airframe 32 of the aircraft 30, as well as one or more landing gears 36, 37, 38. This or these landing gears 36, 37, 38 may be fixed or retractable. The aircraft 30 may also comprise at least one lift rotor 35.

All the landing gears 36, 37, 38 of such an aircraft 30 may comprise an aforementioned landing gear unit 20, the shock absorber 22 of each of these landing gear units 20 being connected to the structure 31. Alternatively, a single landing gear 36 of the aircraft 30 may include a landing gear unit 20, or two of the landing gears 36, 37, 38 may include a landing gear unit 20.

For each landing gear unit 20, the shock absorber 22 may be connected to the structure 31 via its body 23, the piston 24 being connected to the contact member 21, or vice versa.

For each landing gear unit 20 provided with a static electricity dissipation system, the wand 15 is electrically connected to the structure 31 and to the airframe 32 of the aircraft 30, for example via a conventional metallization circuit. This electrical connection between, on the one hand, the wand 15 and, on the other hand, the structure 31 and the airframe 32, contributes to the dissipation of the static electricity accumulated and stored by the airframe 32 and the structure 31 during a flight of the aircraft 30, when the wand 15 is in contact with the ground 50 during the landing of the aircraft 30.

Naturally, the present disclosure may be subjected to numerous variations as to its implementation. Although several embodiments are described above, it should readily be understood that it is not conceivable to identify exhaustively all the possible embodiments. It is of course possible to replace any of the means described with equivalent means without going beyond the ambit of the present disclosure.

What is claimed is:

1. A landing gear unit comprising at least one contact member, a shock absorber and a static electricity dissipation system, the shock absorber being compressed along a damping axis, the shock absorber being connected to the contact member, wherein the static electricity dissipation system comprises:

a framework integral with a rotation shaft about which the contact member rotates, the framework being provided with a main guide rail and a bottom stop;

a slider having one degree of freedom of motion in translation along the main guide rail, along a guide axis;

a metal wand attached to the slider, the wand having an elongate shape and extending from the slider towards the bottom stop, the bottom stop having an orifice configured to guide the wand in translation; and a drive part connected to the shock absorber, and movable with respect to the rotation shaft, the drive part moving with respect to the framework towards the bottom stop, parallel to the damping axis, when the shock absorber is compressed to generate sliding of the slider along the main guide rail.

2. The landing gear unit according to claim 1, wherein the shock absorber is provided with a body and a piston sliding in the body along the damping axis, the piston being connected to the rotation shaft and the drive part being integral with the body.

3. The landing gear unit according to claim 2, wherein, when the piston is in a maximum extended position with respect to the body, the wand protrudes from the bottom stop by a non-zero extension distance.

4. The landing gear unit according to claim 1, wherein the framework comprises a secondary guide rail, the drive part having one degree of freedom of motion in translation along the secondary guide rail.

5. The landing gear unit according to claim 1, wherein the drive part is integral with the slider.

6. The landing gear unit according to claim 1, wherein the static electricity dissipation system includes a lift spring arranged between the slider and the bottom stop, the lift spring being compressed between the slider and the bottom stop when the shock absorber is compressed.

7. The landing gear unit according to claim 6, wherein the framework comprises a top stop to which the slider slides along the main guide rail, along the guide axis, under the action of the compressed lift spring, the slider being positioned between the top and bottom stops, the framework comprising a ramp inclined with respect to the guide axis and the slider comprising a support, as well as a slide-in unit and a return spring, the slide-in unit having one degree of freedom of motion in translation with respect to the support along a sliding axis not parallel to the guide axis, in order to slide with respect to the support, the slide-in unit having a protuberance configured to cooperate with the ramp in order to cause the slide-in unit to move with respect to the support along the sliding axis between an extended position and a retracted position, the return spring opposing the movement of the slide-in unit from the extended position to the retracted position, the drive part and the slide-in unit being partially in line with each other parallel to the guide axis AX2 when the slide-in unit is in the extended position, the drive part and the slide-in unit not being in line with each other parallel to the guide axis AX2 when the slide-in unit is in the retracted position.

8. The landing gear unit according to claim 7, wherein the sliding axis is perpendicular to the guide axis.

9. The landing gear unit according to claim 7, wherein the ramp is positioned with respect to the contact member such that the slide-in unit is in the retracted position when the wand protrudes from the bottom stop by a predetermined deployed distance.

10. The landing gear unit according to claim 9, wherein the predetermined deployed distance is greater than a distance between the bottom stop and the ground when the landing gear unit is in contact with the ground.

11. The landing gear unit according to claim 7, wherein the system comprises a compressible sleeve arranged between the slider and the bottom stop and wherein the wand is positioned, the lift spring being positioned around the sleeve.

12. The landing gear unit according to claim 7, wherein the system comprises a compressible tube arranged between the slider and the bottom stop, the lift spring being positioned in the tube.

13. An aircraft comprising at least one landing gear unit according to claim 1.

14. An aircraft according to claim 13, the aircraft comprising a plurality of landing gear units.

* * * * *